No. 854,955. PATENTED MAY 28, 1907.
C. F. MARTIN.
VETERINARY TOOTH CUTTER OR DENTAL FLOAT.
APPLICATION FILED APR. 16, 1906.
2 SHEETS—SHEET 2.
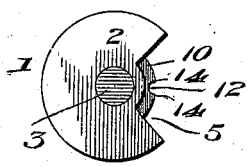
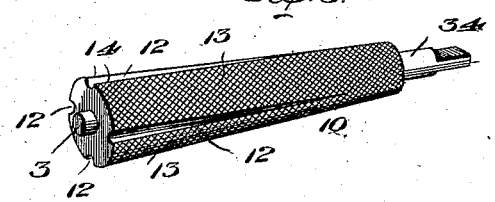
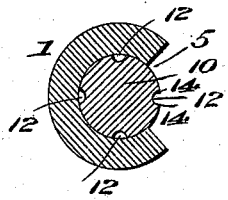
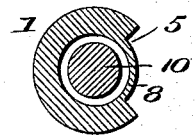
Witnesses
Inventor
Charles F. Martin
By Frank C. Gore
His Attorney
THE NORRIS PETERS CO., WASHINGTON, D. C.

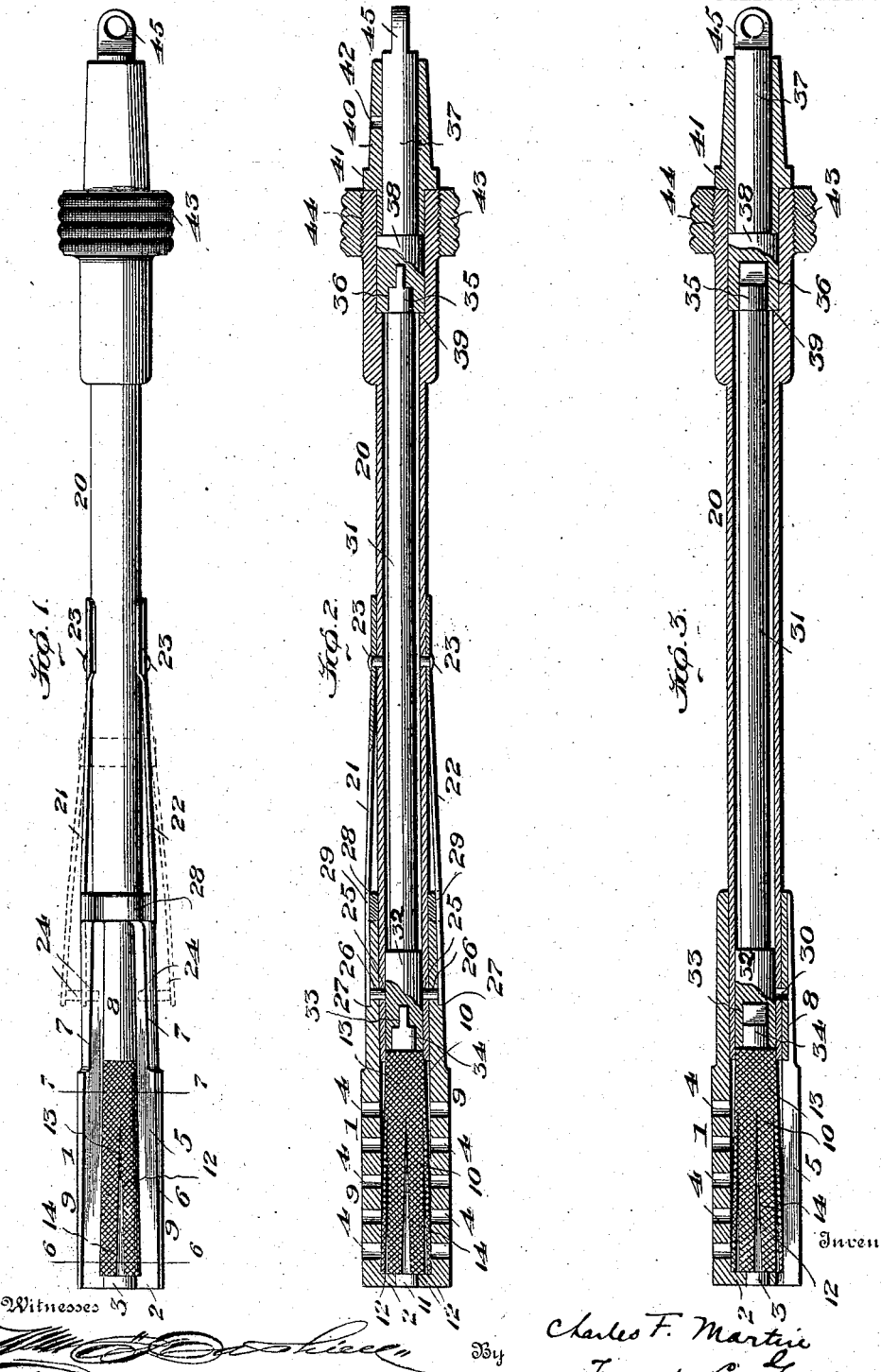

UNITED STATES PATENT OFFICE.

CHARLES F. MARTIN, OF EVANSVILLE, INDIANA.

VETERINARY TOOTH-CUTTER OR DENTAL FLOAT.

No. 854,955.  Specification of Letters Patent.  Patented May 28, 1907.

Application filed April 16, 1906. Serial No. 311,982.

*To all whom it may concern:*

Be it known that I, CHARLES F. MARTIN, a citizen of the United States, residing at Evansville, county of Vanderburg, and State of Indiana, have invented certain new and useful Improvements in Veterinary Tooth-Cutters or Dental Floats, of which the following is a specification.

My invention relates to veterinary tooth cutters or dental floats.

The object of the invention is the provision of a veterinary tooth cutter or dental float especially adapted for leveling the molar teeth of horses, oxen, mules and asses which will be simple, strong, inexpensive to manufacture and efficient in operation.

In the present invention, my object is to provide a cutter or float which will be especially constructed and adapted for operation on the molar teeth of animals and will have novel means for guarding the lips and gums of the animal from laceration as the cutter is drawn forward from the last molar in the leveling operation; another object is the provision of an improved cutter which will act both as a file and as a leveler; a still further object is to provide a novel handle portion, novel means for rotating the cutter, and novel means for locking said parts detachably together, whereby they may be readily attached or separated for purposes of oiling, cleaning, or repairs.

The invention is set forth fully hereinafter and recited in the appended claims.

In the accompanying drawings: Figure 1 is a front view, dotted lines showing how the spring locking members for the holder can be spread to release the holder; Figs. 2 and 3, longitudinal sections of Fig. 1 at right-angles to each other; Fig. 4, an end view of the holder; Fig. 5, a detail of the cutter; Fig. 6, a section on line 6—6 of Fig. 1; and Fig. 7, a section on line 7—7 of Fig. 1.

The holder 1 is of general tubular form and has a solid outer end wall 2 provided with a bearing 3 for the journal of the cutter. Holes 4 are provided for the escape of the cuttings. One side of the holder is cut away longitudinally at 5 to expose the cutter, and the margins 6 of this cut-away portion 5 converge inwardly from the closed guard end 2 and continue at 7 below the outer surface of the holder, and between these margins 7, the holder is made solid at 8, said solid portion 8 being considerably depressed below the outer surface of the holder. This peculiar manner of cutting away or forming the holder, provides the inclined guard and guide walls 9, which extend longitudinally of the holder and lie in radii of the holder emanating from the central longitudinal axis of said holder.

The rotary cutter 10 is cone-shaped or tapering from its outer larger end which lies against the end wall 2 of the holder where it is provided with a stub journal 11 received in the bearing 3, to its smaller end which lies just underneath the solid portion 8, said cutter being composed of alternating grooves 12 and roughened or filing surfaces 13. The grooves 12 are depressed at their outer ends and become more shallow as they proceed inwardly until they finally merge in the surface of the cutter, and these grooves provide leveling or cutting edges 14.

It will be observed that for the greater part of its length, the cutter projects into the opening 5, projecting to a lesser degree the nearer it approaches the part 8.

The handle or driving shaft holder 20 is of tubular metal and received in the holder to which it is detachably locked by spring latches 21 and 22 secured at 23 to the handle and having locking pins 24 on their free ends which are adapted to pass through openings 25 in the handle and into openings 26 in the holder, recesses or seats 27 being provided on opposite sides of the holder to snugly receive the free ends of the spring latches.

The numeral 28 designates a releasing member which is slidable on the handle 20 and provided with notches 29 in its opposite sides which receive the spring latches 21 and 22. An oil hole 30 is provided in the handle. Rotatably mounted within the handle is an operating shaft 31, which has a sleeve 32 secured thereto, and the end of this shaft is provided with a notch 33 to receive the flattened coupling 34 on the end of the cutter, said end being received in the sleeve 32. The sleeve 32 snugly, yet easily, fits the handle and is located under the oil hole 30. The other end of the operating shaft 31 is provided with a coupling member 35 which is received in a notch 36 in the end of another shaft section 37, which is provided with a sleeve 38 fitting and journaled in an enlarged part of the handle and held against a shoulder 39 by a sleeve 40 having a shoulder 41 which bears against the end of the handle. This sleeve receives the shaft section 37 and affords a bearing for said shaft section, an oil hole 42 being provided in the sleeve. A knurled nut or sleeve 43 is connected by screw-threads 44 to the handle and, by its engagement with the shoulder 41, holds the cutter, the shaft sections, and the sleeve against longitudinal displacement or disconnection.

Any suitable flexible shaft leading to a motor of any kind is connected to the eye 45 of the shaft section 37.

In using the cutter or float, the operator grasps the handle and inserts the holder in the mouth of the animal until the rearmost molar is against the part 8. The tool is then drawn forward and the part 8 successively passes from the molars so that they bear against the cutter which acts on them more or less gently at first on account of the taper of the cutter and finally cuts and levels them to the desired degree, the file 13 of the cutter acting as levelers and the cutting edges 14 acting to cut off the ragged portions of the molars. During the operation of cutting, the gums and lips are protected from injury by the end guard 2 and by the side guards 9, and the latter tend to prevent the device from slipping off laterally from the molars, while inclined guard faces 9, on account of their convergence toward the longitudinal axis of the cutter, tend to hold the cutter to the molars.

Having thus described my invention, what I claim as new and desire to secure by Letters Patent, is:—

1. In a veterinary tooth cutter or dental float, a cutter having toothed or roughened surfaces on its periphery alternating with longitudinally extending grooves in said periphery.

2. In a veterinary tooth cutter or dental float, the combination with a holder having a cut-out or open portion provided with longitudinally extending guard and guide walls at the sides of said opening, said guard and guide walls converging toward each other from the outer end of the holder inwardly thereof as they proceed inwardly, of a cutter located within said holder and having a portion projecting into the cut-out or open portion aforesaid.

3. In a veterinary tooth cutter or dental float, the combination with a holder having a cut-out or open portion provided with longitudinally extending guard and guide walls at the sides of said openings, said holder having a depressed solid portion located inwardly from the cut-out or open portion aforesaid and said guard and guide walls being continued along said depressed portion of the holder, said depressed portion being located therebetween, of a cutter located within said holder and having a portion projecting into the cut-out or open portion aforesaid.

4. In a veterinary tooth cutter or dental float, the combination with a holder, of a cutter therein, a tubular handle detachably connected to the holder and provided with an internal shoulder, a sectional drive shaft within the handle adapted for operating the cutter, one section of the drive shaft being adapted to abut the shoulder, and means for preventing displacement of the drive shaft in the opposite direction.

5. In a veterinary tooth cutter or dental float, the combination with a holder, of a cutter therein, a tubular handle detachably connected to the holder and provided with an internal shoulder, a sectional drive shaft within the handle adapted for operating the cutter, one section of the drive shaft being adapted to abut the shoulder, means for preventing displacement of the drive shaft in the opposite direction comprising a sleeve having a shoulder and receiving the shouldered section of the drive shaft, and a nut detachably engaged with the handle and bearing on the shoulder of the sleeve.

6. In a veterinary tooth cutter or dental float, the combination with a cutter holder, of a cutter therein, a handle, and a releasable connection which fastens the handle to the holder comprising a spring latch on one of said parts for engaging the other of said parts, and means for releasing said spring latch.

7. In a veterinary tooth cutter or dental float, the combination with a cutter holder, of a handle, said holder and handle having a telescopic connection with each other, and a spring arm connected to one of said members and provided with a pin to engage an opening in the other of said members and having its free end received in the recess in the member with which it is engaged.

8. In a veterinary tooth cutter or dental float, the combination with a cutter holder, of a handle having a telescopic connection therewith, one of said members having oppositely disposed recesses, spring arms connected to the other of said members on opposite sides thereof and having free ends provided with pins adapted for engagement with the recessed member and themselves adapted to lie in said recesses, and a slidable unlatching collar or member for spreading said spring arms apart.

9. In a veterinary tooth cutter or dental float, the combination with a holder having a closed outer end constituting a guard and a cut-out or open side provided with longitudinal walls or margins extending to the outer face of the closed outer end aforesaid, of a cutter located in said holder and having a portion projecting into the cut-out or open side aforesaid.

In testimony whereof, I hereunto affix my signature in presence of two witnesses.

CHARLES F. MARTIN.

Witnesses:
A. F. FUNKHOUSER,
FRANK C. GORE.